US012567436B1

(12) United States Patent
French et al.

(10) Patent No.: US 12,567,436 B1
(45) Date of Patent: Mar. 3, 2026

(54) SERVO SECTORS HAVING MULTIPLE SERVO ADDRESS MARKS IN A DATA STORAGE DEVICE

(71) Applicant: Western Digital Technologies, Inc., San Jose, CA (US)

(72) Inventors: James French, Grand Junction, CO (US); Guoxiao Guo, Irvine, CA (US); Gary Herbst, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/999,031

(22) Filed: Dec. 23, 2024

(51) Int. Cl.
*G11B 5/596* (2006.01)
*G11B 5/012* (2006.01)

(52) U.S. Cl.
CPC .................................... *G11B 5/012* (2013.01)

(58) Field of Classification Search
CPC .. G11B 5/54; G11B 5/58; G11B 27/36; G11B 5/00; G11B 2005/0021; G11B 5/59688
USPC .......................................................... 360/48
See application file for complete search history.

(56) References Cited

U.S. PATENT DOCUMENTS

| | | | |
|---|---|---|---|
| 6,765,748 B2 * | 7/2004 | Shu | G11B 5/59627 360/77.04 |
| 6,995,935 B2 | 2/2006 | Ehrlich | |
| 7,710,676 B1 | 5/2010 | Chue | |
| 8,711,504 B1 | 4/2014 | Everett | |
| 8,711,506 B1 | 4/2014 | Giovenzana | |
| 8,760,794 B1 | 6/2014 | Coker | |
| 8,861,118 B1 | 10/2014 | Creech | |
| 10,163,459 B1 | 12/2018 | French, Jr. | |
| 11,417,362 B2 | 8/2022 | French, Jr. | |
| 2011/0181977 A1 | 7/2011 | Kim | |

FOREIGN PATENT DOCUMENTS

| | | |
|---|---|---|
| EP | 0494869 A1 | 7/1992 |
| JP | 2008159222 A | 7/2008 |

OTHER PUBLICATIONS

Lee, "Advances in Servo Track Writing (STW) Technologies: A Review", J. Korean Soc. Precis. Eng., vol. 37, No. 2, pp. 163-171 (Feb. 2020).

* cited by examiner

*Primary Examiner* — Nabil Z Hindi
(74) *Attorney, Agent, or Firm* — Patent Law Works LLP

(57) ABSTRACT

Example storage medium servo patterns, data storage devices, and methods to provide servo tracks with multiple servo synchronization or servo address marks per servo sector in a data storage device are described. The data storage device may include storage media, such as magnetic disks, having servo sectors that define servo tracks, where each servo sector has a first servo address mark before the track identifier and a second servo address mark following the track identifier. Which servo address mark is used for processing the servo sector is based on the current servo operating mode, such as write operations versus seek operations.

20 Claims, 8 Drawing Sheets

600

700

Determine Track Follow
Mode
710

Maintain Track Identifier
from Prior Servo
Operation 712

Select Delayed Servo
Gate
714

Read/Process Second
Servo Address Mark
716

Determine Symbol Timing
from Second Servo
Address Mark 718

Process Servo Bursts
Using Symbol Timing
720

Generate Position Error
Signal
722

Send Position Error
Signal to Servo Control
Loop 724

800

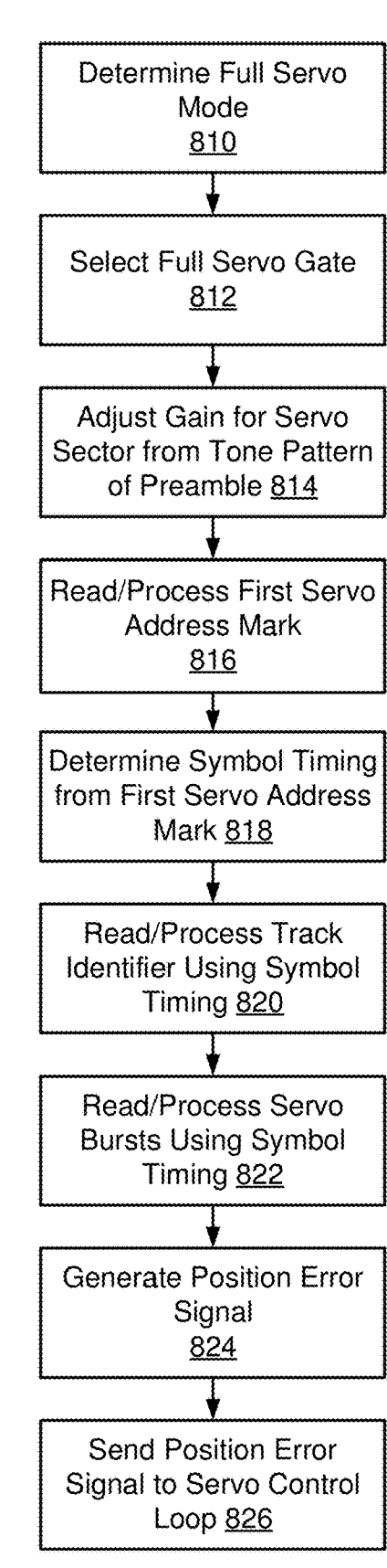

Determine Full Servo
Mode
810

Select Full Servo Gate
812

Adjust Gain for Servo
Sector from Tone Pattern
of Preamble 814

Read/Process First Servo
Address Mark
816

Determine Symbol Timing
from First Servo Address
Mark 818

Read/Process Track
Identifier Using Symbol
Timing 820

Read/Process Servo
Bursts Using Symbol
Timing 822

Generate Position Error
Signal
824

Send Position Error
Signal to Servo Control
Loop 826

Determine Data Write
Mode
910

Write Data to Preceding
Data Sector 912

Select Delayed Servo
Gate
914

Write Data to Preceding
Data Sector During Servo
Gate Delay 916

Switch from Write
Element to Read Element
at Delayed Gate 918

Read Second Servo
Address Mark
920

SERVO SECTORS HAVING MULTIPLE SERVO ADDRESS MARKS IN A DATA STORAGE DEVICE

TECHNICAL FIELD

The present disclosure relates to servo control for data storage devices. In particular, the present disclosure relates to using servo patterns with multiple timing or synchronization fields.

BACKGROUND

Data storage devices such as hard disk drives comprise a magnetic disk and a head connected to a distal end of an actuator arm which is rotated about a pivot by a voice coil motor (VCM) to position the head radially over the disk. The disk comprises a plurality of radially spaced tracks for recording user data sectors and servo sectors. In some configurations, referred to as concentric track, the radially spaced data tracks comprise concentric rings with starting and ending positions in the same ring, sometimes including one or more parity sectors at the end of the track. In some configurations, referred to as spiral track, the radially spaced data tracks comprise at least one continuous spiral comprising multiple data tracks and multiple revolutions of the disk, with track starting and ending positions at selected points along the spiral. The servo sectors comprise head positioning information (e.g., a track address) which is read by the head and processed by a servo control system to control the actuator arm as it seeks from track to track. The magnetic disk acts as a non-volatile storage medium for storing data.

The prior art disk format of FIG. 1A also comprises a number of servo sectors $6_0$-$6_N$ recorded around the circumference of the disk 2 that define a plurality of servo tracks, wherein the data tracks 4 are defined relative to the servo tracks. Each servo sector 6; may comprise a preamble 8 for storing a periodic pattern, which allows proper gain adjustment and timing synchronization of the read signal, and a sync mark 10, sometimes referred to as a servo address mark, for storing a special pattern used to symbol synchronize to a servo data field 12. The servo data field 12 stores coarse head positioning information, such as a track address, used to position the head over a target data track during a seek operation. Each servo sector 6; may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

To facilitate demodulating the servo sectors $6_0$-$6_N$, a timing control loop generates a disk locked clock synchronized to the data rate of the servo sectors $6_0$-$6_N$. The disk locked clock generates suitable timing information, such as a servo gate that times the circumferential location of the servo sectors $6_0$-$6_N$, and a sync window that times the circumferential location of the sync marks 10 within the servo sectors $6_0$-$6_N$ as shown in FIG. 1B. Proper synchronization enables the processing of servo data 12 and servo bursts 14 following sync mark 10.

There is a general desire to limit the amount of disk surface allocated to servo sectors, since disk surface allocated to servo sectors is not used for data sectors. In order to improve format efficiency, more efficient (yet still reliable) configurations of servo sectors and the fields they contain have been developed. One limitation of servo formats has been the need to switch between write and read elements during data write operations. Even when writing to data sectors, the head switches between the write element and the read element to periodically read the servo sector and provide positioning information to keep the writing on track. Because the reader leads the writer by a read-write separation in the down track direction based on head geometry, there is generally an unwritten segment that is wasted when servo gate is asserted and writing stops.

There is a need for technology that improves format efficiency through reducing the separation between written data in the data sector and the following servo sector.

SUMMARY

Various aspects for data storage devices with servo sectors having multiple servo address marks are described, particularly servo sectors that include two servo address marks in different positions to enable symbol synchronization with different servo gates for different servo operating modes.

One general aspect includes a data storage device that includes a storage medium having a plurality of angularly spaced servo sectors defining a plurality of servo tracks and corresponding data sectors between consecutive servo sectors, where each servo sector is comprised of servo patterns corresponding to different servo tracks and including: a track identifier; a set of position error bursts; a first servo address mark preceding the track identifier; and a second servo address mark following the track identifier. The data storage device also includes a head actuated over the storage medium for reading the plurality of angularly spaced servo sectors and control circuitry configured to selectively switch, based on a servo operating mode, between the first servo address mark and the second servo address mark for determining symbol timing for processing the servo pattern.

Implementations may include one or more of the following features. The control circuitry may be further configured to determine a servo operating mode selected from: a track follow mode; a data write mode; a data read mode; a seek mode; a head switch mode; a head load mode; and an error recovery mode. The control circuitry may be further configured to: responsive to determining the track follow mode, use the second servo address mark to determine symbol timing for processing the set of position error bursts; and, responsive to determining another servo operating mode, use the first servo address mark to determine symbol timing for processing the track identifier and the set of position error bursts. Processing the track identifier using the second servo address mark may include post-processing the track identifier based on symbol timing determined from the second servo address mark. The servo patterns may further include a preamble that includes a tone pattern for adjusting gain for reading the corresponding servo sector. The first servo address mark may be positioned between the preamble and the track identifier. Processing the track identifier using the first servo address mark may include determining symbol timing from the first servo address mark prior to reading the track identifier. The head may include a read element and a write element; a relative position of the read element to the write element in a down track direction may determine a read-write separation; and a combined length of the preamble, the first servo address mark, and the track identifier may be less than the read-write separation. The servo operating mode may include a data write mode and the control circuitry may be further configured to, during the data write mode: write data to a target data sector preceding a corresponding servo sector; switch, based on the read-write separation, from the write element of the head to the read element of the head while the read element is positioned over the track identifier; and read, responsive to switching to the read element, the second servo address mark. The first servo address mark may include a different field value than the second servo address mark. The control circuitry may be further configured to, responsive to the servo operating mode, select between a full servo gate for using the first servo address mark and a delayed servo gate for using the second servo address mark. The track identifier may be encoded as a Gray code value; the set of position error bursts may include at least two burst patterns offset from a servo track center; and the second servo address mark may be located in a distinct set of symbols between the track identifier and the set of position error bursts.

Another general aspect includes a method that includes actuating a head over a storage medium for reading a plurality of servo tracks, where: the storage medium may include a plurality of angularly spaced servo sectors defining the plurality of servo tracks and corresponding data sectors between consecutive servo sectors; and each servo sector includes servo patterns corresponding to different servo tracks and including a track identifier, a set of position error bursts, a first servo address mark preceding the track identifier, and a second servo address mark following the track identifier. The method also includes selectively switching, based on a servo operating mode, between the first servo address mark and the second servo address mark for determining symbol timing for processing the servo pattern; and positioning the head based on a read signal from the servo pattern and the determined symbol timing.

Implementations may include one or more of the following features. The method may include determining the servo operating mode selected from: a track follow mode; a data write mode; a data read mode; a seek mode; a head switch mode; a head load mode; and an error recovery mode. The method may include: responsive to determining the track follow mode, using the second servo address mark to determine symbol timing for processing the set of position error bursts; and, responsive to determining another servo operating mode, using the first servo address mark to determine symbol timing for processing the track identifier and the set of position error bursts. Processing the track identifier using the second servo address mark may include post-processing the track identifier based on symbol timing determined from the second servo address mark. The servo patterns may further include a preamble that includes a tone pattern for adjusting gain for reading the corresponding servo sector; the first servo address mark may be positioned between the preamble and the track identifier; and processing the track identifier using the first servo address mark may include determining symbol timing from the first servo address mark prior to reading the track identifier. The head may include a read element and a write element; a relative position of the read element to the write element in a down track direction may determine a read-write separation; and a combined length of the preamble, the first servo address mark, and the track identifier may be less than the read-write separation. The method may include, responsive to the servo operating mode being a data write mode: writing data to a target data sector preceding a corresponding servo sector; switching from a write element of the head to a read element of the head while the read element is positioned over the track identifier, where a relative position of the read element to the write element in a down track direction determines a read-write separation for switching; and reading, responsive to switching to the read element, the second servo address mark. The first servo address mark may include a different field value than the second servo address mark. The method may include, responsive to the servo operating mode, selecting between a full servo gate for using the first servo address mark and a delayed servo gate for using the second servo address mark.

Still another general aspect includes a data storage device that includes a storage medium including a plurality of angularly spaced servo sectors defining a plurality of servo tracks and corresponding data sectors between consecutive servo sectors, where each servo sector includes servo patterns corresponding to different servo tracks and that include: a track identifier; a set of position error bursts; a first servo address mark preceding the track identifier; and a second servo address mark following the track identifier. The data storage device also includes a head actuated over the storage medium for reading the plurality of angularly spaced servo sectors and means for selectively switching, based on a servo operating mode, between the first servo address mark and the second servo address mark for determining symbol timing for processing the servo pattern.

The present disclosure describes various aspects of innovative technology capable of improving format efficiency and related capacity and/or reliability gains. The various embodiments include operations and control circuitry to overcome or at least reduce issues previously encountered in data storage devices and, accordingly, are more efficient, reliable, and/or higher performance than other data storage devices. That is, the various embodiments disclosed herein include hardware and/or software with functionality to improve data storage device capacity, such as by using servo sectors with multiple servo address marks that support different servo operating modes. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

FIG. 8 is an example method of using a first servo address mark with a full servo gate during other servo modes.

DETAILED DESCRIPTION

Figures 2A, 2B, 2C:
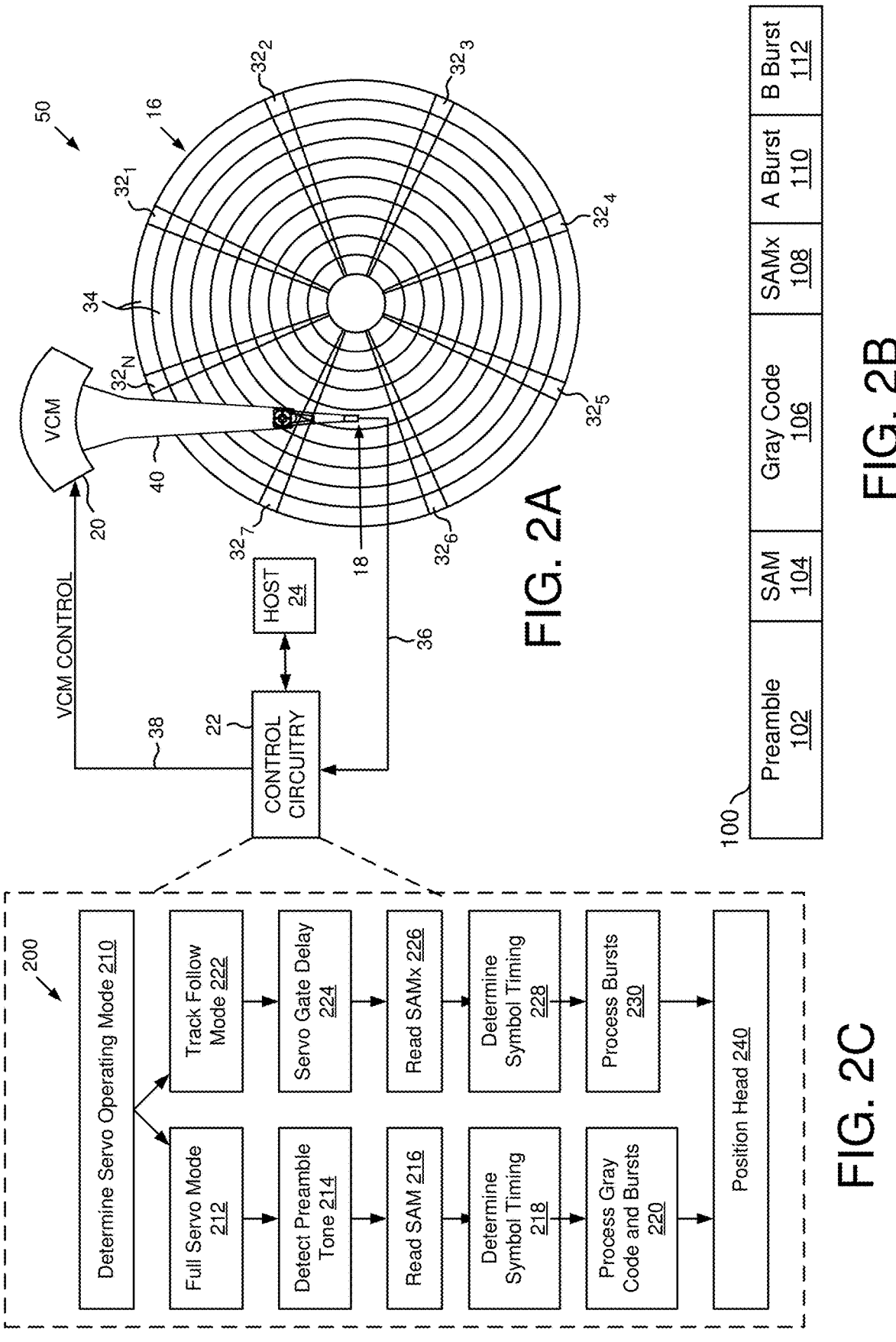
FIG. 2A is a diagram of a data storage device in the form of a disk drive comprising a head actuated over a disk surface written with servo sectors with multiple servo address marks.
FIG. 2B is a diagram of an example servo sector format having two servo address marks.
FIG. 2C is a flow diagram of an example method for selectively switching between servo address marks based on the servo operating mode.

FIG. 2A shows a disk drive 50 comprising a disk 16 comprising a plurality of servo sectors 32₁-32_N defining a plurality of servo tracks 34. FIG. 2B shows an example servo sector format 100 that include multiple servo address marks (SAM), SAM 104 and SAMx 108, at specific positions in servo sector format 100. A head 18 is actuated radially over the disk 16, and control circuitry 22 is operable to execute the flow diagram of FIG. 2C for using multiple servo address marks from servo sector format 100 during different servo operating modes.

In FIG. 2A, the control circuitry 22 processes a read signal 36 emanating from the head 18 to demodulate the servo sectors 32₁-32_N and generate a position error signal (PES) representing an error between the actual position of the head and a target position relative to a target track in a track follow operation. Control circuitry 22 filters the PES using suitable compensation filters to generate a control signal 38 applied to a voice coil motor (VCM) 20 which rotates an actuator arm 40 about a pivot, thereby actuating head 18 radially over the disk 16 in a direction that reduces the PES. Servo sectors 32₁-32_N may comprise any suitable position information, such as a track and wedge address for coarse positioning and servo bursts for fine positioning. Control circuitry 22 may further read and write data to the data sectors between servo sectors 32₁-32_N and may interface with a host system 24 to provide data storage and retrieval for that system.

In FIG. 2B, servo sector format 100 may correspond to the servo sector fields of a servo pattern repeated for each servo sector 32₁-32_N of each servo track 34. The fields of servo sector format 100 are shown in a down track direction from left to right such that, when head 18 passes over a servo sector (or, more accurately, the servo sector moves past the head in accordance with the spin of disk 16), the resulting read signal 36 includes preamble 102, followed by SAM 104, followed by Gray code 106, followed by SAMx 108, followed by A Burst 110, followed by B Burst 112. In some configurations, each field corresponds to a predetermined field length of symbols or bits written to the storage medium during a servo write process. Each field corresponds to a sequential series of symbol values of the field length that are distinct from the adjacent fields and may be processed through different logic in accordance with that field's function. In some configurations, servo sector format 100 may include additional fields such as a compensation value for repeatable runout.

Preamble 102 may include a repeating tone pattern, such as a 2T or 3T pattern of repeating symbols, that may provide an initial signal for the sector to facilitate gain adjustment and frequency timing for sampling the read signal. For example, preamble 102 may include large number of cycles relative to the other fields in the series, such as 30 or more cycles of repeating tone symbols, that lower the accuracy requirements for an initial servo gate and provide for reliable adjustment of gain and channel timing lock.

SAM 104 and SAMx 108 may both be servo address mark fields used for synchronization of symbol timing for reading other portions of the servo sector. In some configurations, SAM values may also be used with timing information for write and read operations in the following data sector. In some configurations, SAM 104 and SAMx 108 may be identical encoded values and the same decoding hardware or software may be used to process them and determine the symbol timing. In other configurations, SAM 104 and SAMx 108 may be different field values from one another, though they represent the same symbol timing relative to, in particular, the servo bursts. For example, SAM 104 and SAMx 108 may be synchronization marks having different field lengths, synchronization patterns, and/or encoding schemes. Different field lengths, synchronization patterns, and/or encoding schemes may enable SAM 104 and SAMx 108 to be separately optimized for their respective servo field positions and the most likely operating conditions for their use (e.g., seek versus track follow operations) to further improve format efficiency, such as by using a shorter SAM field for SAMx 108. Further SAM 104 and SAMx 108 may be selected to support different decoder hardware and/or available in the control circuitry of the data storage device. In some configurations, the SAM fields may be used in combination to provide extended synchronization and/or timing information in some operating modes.

Gray code 106 is an example track identifier. Track identifiers may encode coarse track and sector information for identifying the position of the servo track and servo sector on the disk relative to other tracks and sectors. Gray code may be used to encode the track identifier in a set of bits of a predetermined field length defined by the format. Because partial reads of individual track Gray code values are common during seek operations, Grey codes may be constructed such that portions of the track identifier can be combined from adjacent tracks to give approximate track location during seeks. Symbol timing for correctly positioning bits in the Gray code may be important for properly decoding the Gray code and ensuring accurate gross positioning information during full servo operations, such as seek, head load, head switch, and servo error recovery, where gross position may be rapidly changing or have an unknown starting value.

Figures 1A, 1B:
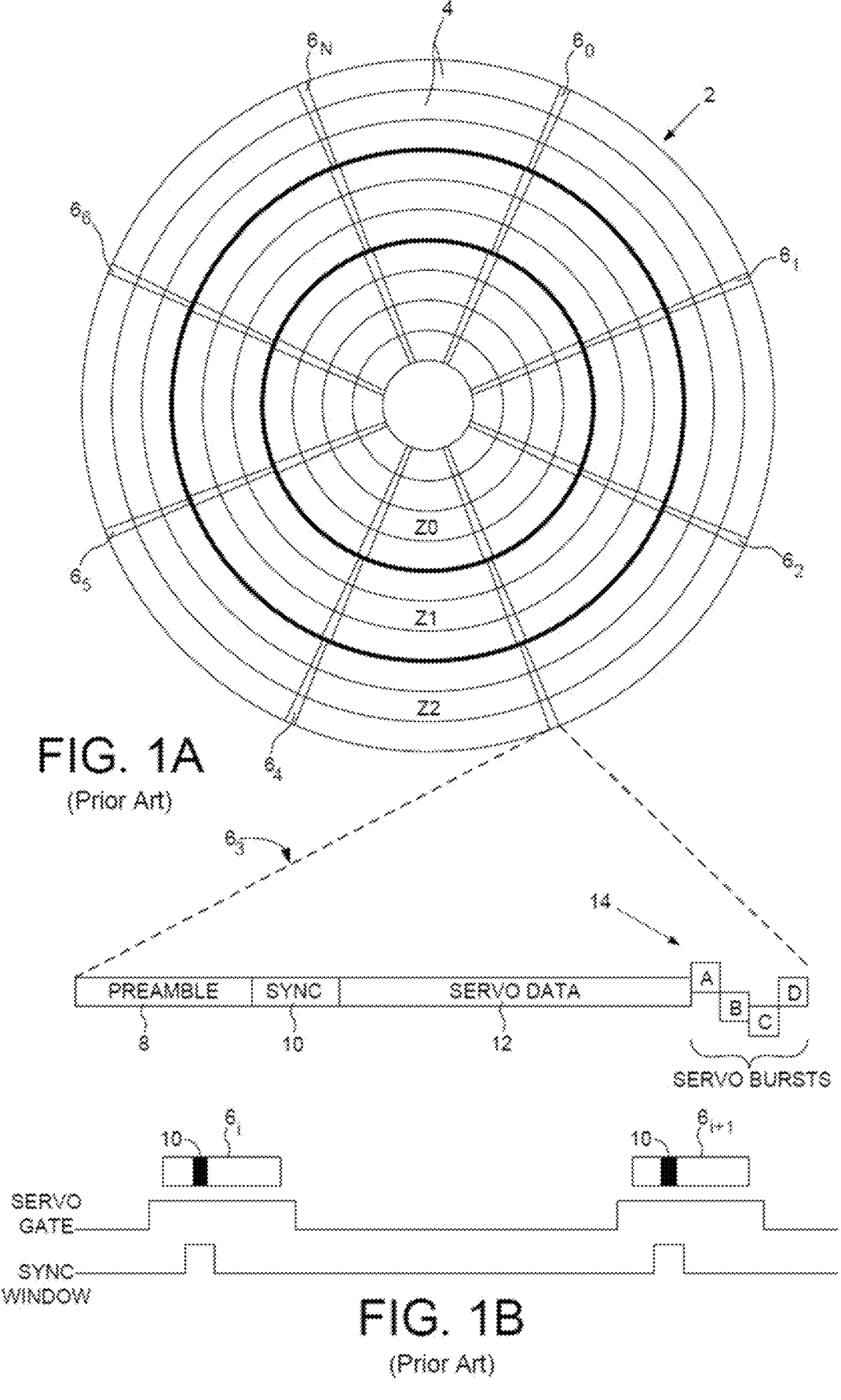
FIG. 1A is a diagram of a prior art disk format.
FIG. 1B is a diagram of prior art servo timing signals, including a servo gate and sync window for a servo address mark.

Servo positioning bursts 110 and 112 may provide fine positioning information relative to track center. For example, a set of position error bursts (A and B bursts in FIG. 2B) may act as a position error field that provides fractional track position based on a nominal track center. The PES for a servo sector read may be determined based on the relative values of the different bursts in the set. Assuring that the symbol timing is correct may be important for accurately determining the position error signal from servo positioning bursts 110 and 112. Note that while two servo positioning bursts 110 and 112 are shown in format 100, any appropriate number of servo bursts (such as the 4 bursts in FIG. 1A) may be used, including amplitude or phase-based servo burst patterns.

In FIG. 2C, control circuitry 22 may use servo sector format 100 from disk 16 to operate according to method 200 for selectively switching between servo address marks based on the servo operating mode. FIG. 2C shows a flowchart of method 200 for a servo control process that selectively uses different servo address marks in the servo sector. Method 200 may be executed by the control circuitry 22 of the data storage device 50. Method 200 may result in improved head positioning accuracy during different servo operating modes while improving overall format efficiency for the storage device. In general, the method 200 may involve selectively switching between servo address marks based on the current servo operating mode to optimize servo control.

At block 210, a servo operating mode may be determined. For example, control circuitry 22 may analyze the current operating state of the data storage device 50 to identify whether it is in a track follow mode (or data write mode) or another servo mode.

At block 212, a full servo mode may be identified. For example, control circuitry 22 may determine that the data storage device 50 is performing a seek operation or recovering from an error, necessitating full servo processing.

At block 214, a preamble tone may be detected. For example, control circuitry 22 may detect preamble 102 and use the tone pattern it encodes to adjust gain and achieve timing lock.

At block 216, a first servo address mark may be read. For example, control circuitry 22 may locate and process SAM 104 in a synchronization window.

At block 218, symbol timing may be determined. For example, control circuitry 22 may detect the synchronization mark in SAM 104 to synchronize symbol timing for processing the remaining servo fields.

At block 220, Gray code and servo bursts may be processed. For example, control circuitry 22 may read and process Gray code 106 to determine the corresponding track identifier and A burst 110 and B burst 112 to determine fine positioning information in the form of a position error signal. The second servo address mark, SAMx 108, may be skipped and no synchronization window may be used to process the second servo address mark.

At block 222, a track follow mode may be identified. For example, control circuitry 22 may determine that data storage device 50 is maintaining position over a target track for writing or reading operations. In some configurations, a data write mode may be identified for selectively using the second SAM and non-write modes, including a data read mode, may use the first SAM or a combination of both SAMs.

At block 224, servo gate may be delayed. For example, control circuitry 22 may delay the open of servo gate until the read element of the head is proximate SAMx 108.

At block 226, a second servo address mark may be read. For example, control circuitry 22 may locate and process the SAMx 108 in a synchronization window without processing the preceding servo information.

At block 228, symbol timing may be determined from the second servo address mark. For example, control circuitry 22 may detect the synchronization mark in SAMx 108 to synchronize symbol timing for processing the remaining servo fields.

At block 230, servo bursts may be processed. For example, control circuitry 22 may read and process the A burst 110 and B burst 112 to determine fine positioning information in the form of a position error signal. In some configurations, control circuitry may rely on the previously decoded track number from a prior servo sector during track follow instead of reading it from the current servo sector.

At block 240, the head may be positioned based on the servo sector information. For example, control circuitry 22 may calculate a position error signal based on the processed servo burst information, process the PES through the servo control loop, and provide the resulting VCM control signal 38 to VCM 20 for head positioning adjustments.

Figure 3:
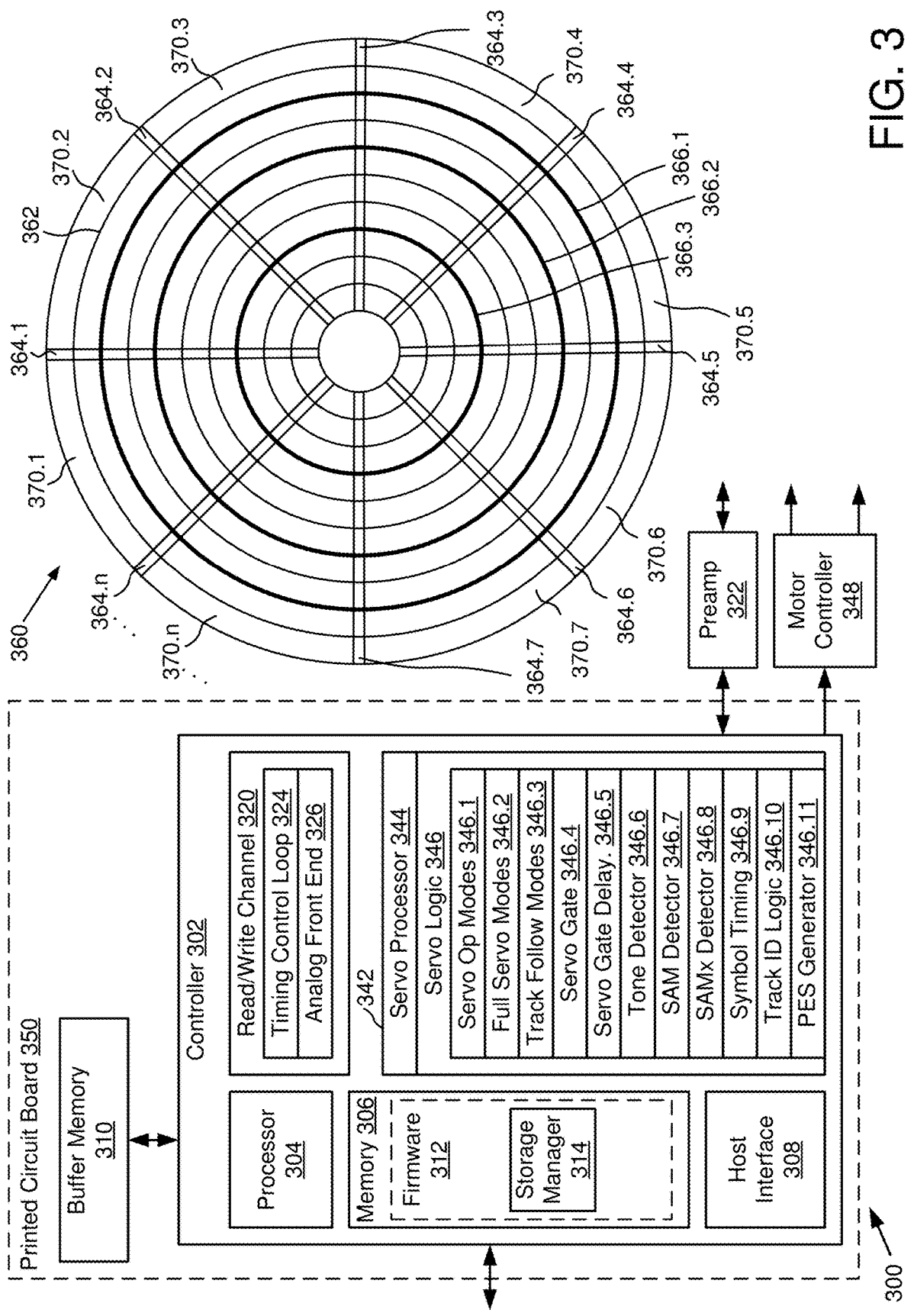
FIG. 3 is a block diagram of a configuration of data storage device including control circuitry and a storage medium format for using servo sectors with multiple servo address marks.

FIG. 3 shows a portion of example control circuitry 300 and a storage medium 360 for a data storage device, such as a hard disk drive (HDD). In the example shown, control circuitry 300 may include one or more hardware controllers that operate alone or in combination. Controller 302 may comprise a storage device controller configured to receive host storage commands, process storage operations for writing, reading, and managing data stored to non-volatile storage media in the disk drive, such as the magnetic media disk of storage medium 360 or FIGS. 1 and 2. In some embodiments, controller 302 may correspond to a separate host interface and read/write path to a subset of disk surfaces in a data storage device with multiple controllers. In some embodiments, controller 302 may be configured to manage servo and read/write operations for one or more actuators, heads, and corresponding writer and reader elements. Storage medium 360 may be formatted with angularly spaced servo sectors 364.1-364.n defining corresponding data sectors 370.1-370.n between consecutive servo sectors. As described elsewhere, servo sectors 364 define servo tracks which may be used to locate data tracks through data sectors 370. In some configurations, servo tracks and/or data tracks may be divided into concentric zones, such as example zones 366.1-366.3.

Controller 302 may comprise a processor 304, a memory 306, a host interface 308, and access to a buffer memory 310. Controllers 302 may also comprise a read/write channel 320, and a servo controller 342 including a servo processor 344 and servo logic 346. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. Controller 302 may include physical and electrical interfaces for connecting to buffer memory 310, a power source (not shown), preamp 322, motor controller 348, other controllers, and/or other circuitry components. In some configurations, the components of controller 302 may be interconnected by a bus that includes one or more conductors that permit communication among the components. For example, processor 304, memory 306, host interface 308, read/write channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. In some configurations, one or more microprocessors or processor cores may be configured to operate alone or in combination to execute the functions described herein. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store controller firmware 312, comprising instructions that include one or more modules or sub-modules for specific data storage device operations and processor 304 may execute those instructions, including controlling communication with other components, such as host interface 308, buffer memory 310, read/write channel 320, and servo controller 342.

Controller firmware 312 may include a storage manager 314 configured to receive host storage commands through host interface 308 and determine storage operations to be executed by controller 302 using read/write channel 320 and servo controller 342. For example, storage manager 314 may process read, write, delete, and similar commands targeting host data to be written to or read from the storage medium of the data storage device. Processing a read operation may include causing servo controller 342 to position the read head over a desired track on the storage medium, applying a read voltage to the read head through preamp 322, receiving the read data in read/write channel 320, decoding the read data from the read head into decoded bit data returned to storage manager 314 (and/or buffer memory 310). Processing a write operation may include causing servo controller 342 to position the write head over a target track on the storage medium and applying a write voltage with a desired write pattern to the write head through preamp 322 to store binary encoded data in the magnetic domains of the storage medium for later retrieval through a read operation. Servo controller 342 may use a combination of track seek operations and track follow operations based on servo tracks to position the head for reading and writing of host data on data tracks.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Read/write channel 320 may provide the analog write signal to and receive the analog read signal from preamp 322, which controls and amplifies signals to and from the heads. Binary data for recording to the storage medium may be received by read/write channel 320 from controller firmware 312 and decoded data from read/write channel 320 may be passed to controller firmware 312 and/or directed to buffer memory 310 for communication to the host.

In some configurations, read/write channel 320 may include an analog front end 326 configured to receive the analog read signal from preamp 322 and convert it into a digital read signal for processing by other components of read/write channel 320. For example, analog front end 326 may include an analog-digital converter (ADC), timing circuit, and one or more filters, equalizers, and/or other signal conditioning components for generating the digital read data. In some configurations, analog front end 326 and/or other components of read/write channel 320 may support operations of servo controller 342. For example, the read signal received through preamp 322 and analog front end 326 may provide the servo read signal based on the read head response generated when the head passes over servo sectors 364 during track seek, track follow, and other servo operations.

In some configurations, channel 320 may include a timing control loop 324 configured to synchronize the read channel with the data rate to determine digital data samples from the analog read signal for further processing by read/write channel 320 and/or servo controller 342. For example, timing control loop 324 may use a phase locked loop (PLL) to synchronize to the frequency and phase of the analog read signal to control the ADC sampling of analog front end 340. In some configurations, the PLL may receive expected samples for a target response from the ADC and use phase error and suitable compensation filters to generate a control signal to adjust the center frequency for synchronizing a disk locked clock. The adjusted frequency from the disk locked clock may be fed back to the ADC and continue to adjust until synchronization is achieved. In some configurations, servo gate and sync windows for servo controller 342 may be determined from timing control loop 324 based on the preamble of the servo sector being read and/or based on SAM-to-SAM timing (using SAM and/or SAMx). Once timing control is established for track follow, servo and/or read data may be used to maintain timing (and gain control) until the next servo wedge, where the timing information derived from the preamble (if available) and/or SAM timing may be used to maintain signal timing. For example, SAM-to-SAM timing across consecutive servo wedges based on SAMx may be used for updating the disk locked clock.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. In some embodiments, servo controller 342 may include servo processor 344 and servo logic 346 (stored in a servo memory). For example, servo processor 344 may include on or more dedicated processor circuits and servo logic 346 may be firmware stored in RAM associated with the dedicated processor to provide dedicated computing resources for managing the servo functions. Servo controller 342 may receive servo signals read from the disk surface using preamp 322 and provided to servo controller 342 through channel 320. Servo controller 342 may provide servo control signals to motor controller 348 and motor controller 348 may control one or more actuator VCMs and/or a spindle motor for rotating the disk stack.

Servo logic 346 may include a set of servo operating modes 346.1 corresponding to the different servo operations that may be executed by servo controller 342. Servo operating modes 346.1 may include track follow modes that operate in conjunction with data read and write operations for maintaining servo position over a target track and various seek or recovery modes for gross repositioning of the servo to locate a target track. Servo operating modes 346.1 may also include operating modes that do not rely on servo feedback for sending control signals to motor controller 348, such as head unload and sweep operations. In some configurations, servo operating modes 346.1 may be grouped into operating modes based on which servo address mark they will use. For example, full servo mode 346.2 may include operating modes that utilize the first SAM to enable use of the track identifier and may also use the preamble to establish gain and timing lock. Full servo modes may include, for example, head load mode for loading the head from off-disk, seek mode for moving between tracks, head switch mode for switching between operations on different head/media pairs in the same disk stack, and servo error recovery mode for recovering from loss of track follow or other servo interruptions. In some configurations, a data read mode may be configured to use full servo mode because there may be no advantage to delaying read gate to the second SAM. Track follow modes 346.3 may include operating modes that utilize the second SAM and may only need symbol timing for the subsequent servo bursts and generating the position error signal. For example, track follow modes 346.3 may include a data write mode used for writing data to data sectors between the servo sectors. In some configurations, track follow modes 346.3 may also include data read mode to reduce the switching between during track follow operations (read or write). In some configurations, one or more operating modes may support the combined use of SAM values, such as to provide an extended synchronization mark based on the combined SAM values. For example, the full servo mode or selected operating modes therein may benefit from selecting and processing signals from both SAM values.

Servo logic 346 may include servo gate logic 346.4 that determines when the read signal from the head is processed through servo controller 342 based on the nominal timing of the servo sector position under the read element of the head. Servo gate logic 346.4 may be configured for triggering servo gate during full servo modes 346.2 to initiate servo read when the preamble is calculated to be under the read element such that the servo read signal includes all fields from the servo sector, preamble, first SAM, track identifier, second SAM, and servo bursts. Servo gate logic 346.4 may include a servo gate delay 346.5 for delaying servo gate during track follow modes using the second SAM. For example, servo gate delay 346.5 may be configured to assert servo gate and initiate processing of the read signal by servo controller 342 immediately prior to the second SAM, such as during an end portion of the preceding track identifier field. Servo gate delay 346.5 may include a timing delay value corresponding to the distance from the beginning of the preamble to the end of the track identifier with some reduction for safety margin to not miss the second SAM. In some configurations, servo gate delay 346.5 may be determined based on the read-write separation of the head and switching from writing data in the data sector as late as possible before switching to read the second SAM.

Servo logic 346 may include a tone detector 346.6 configured to detect the tone pattern of the preamble in response to servo gate 346.4 in full servo modes 346.2. For example, tone detector 346.6 may include a detector circuit that recognizes the tone pattern and uses a plurality of cycles of the tone pattern to set servo gain values and find timing lock for timing control loop 324.

Servo logic 346 may include one or more SAM detectors, such as SAM detector 346.7 and SAMx detector 346.8.

SAM detectors may detect a synchronization mark in the read signal to establish symbol timing 346.9 for accurately reading subsequent bits or symbols and aligning each servo field with the corresponding processing logic. SAM detectors may operate on a synchronization window relative to servo gate 346.4 to execute SAM detection and synchronization to symbol timing 346.9. In some configurations, servo fields may be encoded in bit patterns and symbol timing 346.9 may align with single bit transitions in the read signal. In some configurations, SAM detector 346.7 and SAMx detector 346.8 may be identical and/or a single SAM detector may be used for both SAMs. For example, both SAMs may be encoded with the same synchronization pattern and the different synchronization windows may select the portion of read signal corresponding to the selected SAM and direct it to SAM detector 346.7. In some configurations, SAM detector 346.7 and SAMx detector 346.8 may be different SAM detectors based on different synchronization patterns. For example, the first SAM and the second SAM may be encoded differently to support different synchronization patterns selected for their different roles, synchronization windows, and reliability in synchronizing symbol timing 346.9 for the subsequent servo fields. In some configurations, SAMx detector 346.8 may be configured to provide symbol timing 346.9 for post-processing a previously stored or buffered track identifier.

Servo logic 346 may include track identifier logic 346.10 for determining one or more track identifier values from a track identifier field located between the first SAM and the second SAM. For example, track identifier logic 346.10 may include a Gray code decoder configured to determine one or more track identifier values from the read signal based on symbol timing and the symbol sequence detected in the track identifier field. In some configurations, track identifier logic 346.10 may be configured to determine portions of the Gray code for a given track during seek or recovery operations and use portions from proximate track identifiers to provide coarse location information for controlling the seek or recovery operation.

Servo logic 346 may include PES generator 346.11 configured to process the read signal corresponding to the set of servo bursts for fine positioning feedback to the servo control loop. For example, PES generator 346.11 may process the phase or amplitude values from the servo positioning bursts to determining fractional offsets from track center to determine the PES that is input into the servo control loop to determine a corrective motor control signal sent to motor controller 348 to adjust the positioning of the head for subsequent reads or writes. Symbol timing 346.9 may be applied to the servo position burst samples to assure that the burst read values correspond to the correct bit transitions and corresponding bursts.

Figures 4, 5:
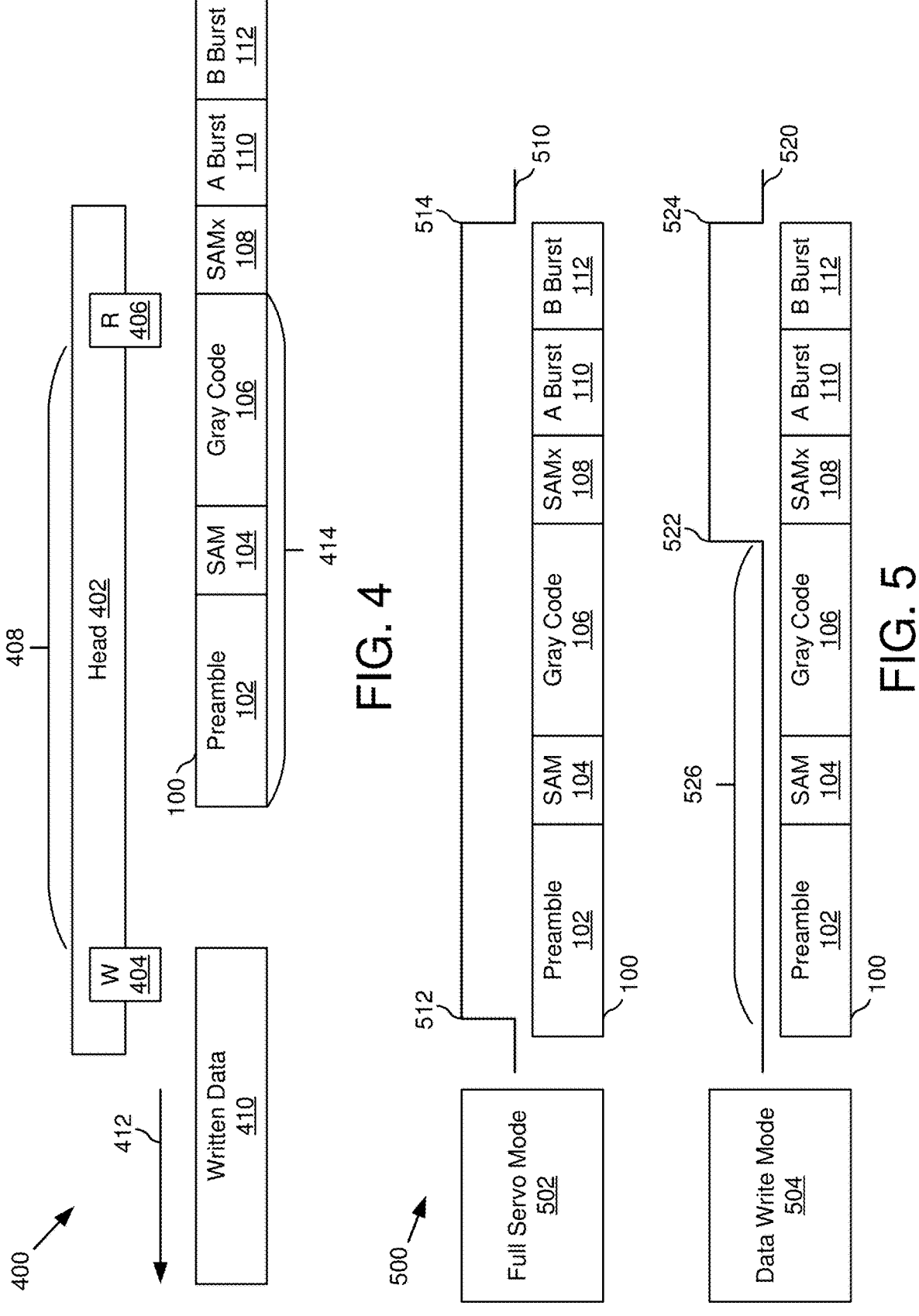
FIG. 4 is a block diagram of an example servo sector format relative to written data and head geometry.
FIG. 5 is a block diagram of an example read gate configuration supporting different read gates for different servo operating modes and servo address marks.

FIG. 4 shows servo sector format 100 relative to written data 410 and head 402. For example, written data 410 and sector format 100 may indicate the data and servo fields written to the storage medium, such as storage medium 360, along a servo track as the head passes from the data sector to the servo sector. Head 402 may include a slider body that positions a plurality of elements, such as write element 404 and read element 406. Write element 404 may include a transducer configured to write magnetic transitions to the storage medium based on a write signal from the control circuitry and read element 406 may include a transducer configured to generate a read signal from the magnetic transitions and provide it to the control circuitry. Write element 404 and read element 406 may be separated from each other in the down track direction by a read-write separation 408 that is the distance along the head between the elements. The storage medium moves in the direction indicated by direction 412 relative to head 402 with read element 406 toward the leading edge of head 402 and write element 404 toward the trailing edge of head 402. Read element 406 may lead write element 404 by read-write separation 408.

During data write operations, write element 404 writes data to the data sector preceding the servo sector having servo sector format 100. While during a full servo mode, write element 404 would need to be switched off in favor of read element 406 as soon as read element 406 reached preamble 102 to initiate servo gate and servo sector processing. During a data write mode using SAMx 108 however, written data 410 may continue into previously unused disk space until read element 406 approaches SAMx 108. As shown a portion 414 of the servo sector may be in the gap between the end of written data 410 and SAMx 108, so long as the combined length of preamble 102, SAM 104, and Gray code 106 is less than the read-write separation 408.

FIG. 5 shows an example read gate configuration 500 supporting different read gates 510 and 520 for different servo operating modes 502 and 504 and servo address marks 104 and 108. In full servo mode 502, a conventional servo gate 510 may be used to trigger servo read and processing at servo gate open 512 proximate the beginning of preamble 102. The servo sector may be read and processed from preamble 102 to servo positioning bursts 110 and 112 and servo gate close 514, using SAM 140 for symbol timing synchronization. In data write mode 504, a delayed servo gate 520 may be used to trigger servo read and processing at delayed servo gate open 522 proximate the beginning for SAMx 108. The latter portion of the servo sector that includes SAMx 108 and servo positioning bursts 110 and 112 may be read and processed to servo gate close 524. Servo gate delay 526 may correspond to the distance or length from the beginning of preamble 102 to the end of Gray code 106, with some margin for assuring that the delayed read gate open 522 occurs before SAMx 108. In some configurations, servo gates 510 and 520 may define corresponding synchronization windows proximate and for the field lengths of SAM 104 and SAMx 108 respectively.

Figure 6:
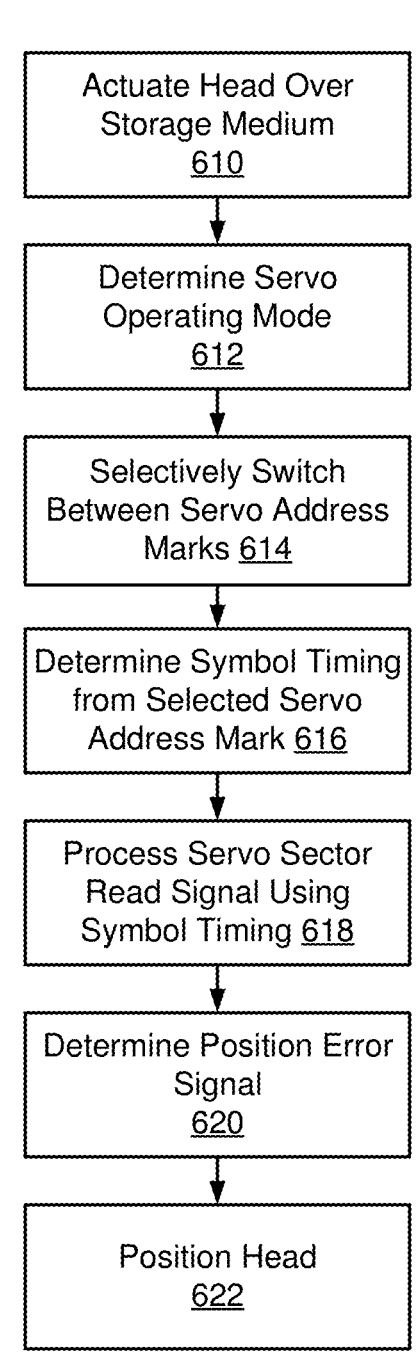
FIG. 6 is an example method of using servo sectors with multiple servo address marks to position a head.

FIG. 6 illustrates a flowchart of a method 600 for positioning a head over a storage medium. Method 600 may be executed by control circuitry 300 and servo controller 342 of a data storage device. Method 600 may result in improved format efficiency and servo processing efficiency during different servo operating modes. In general, method 600 may involve selectively switching between servo address marks based on the current servo operating mode.

At block 610, a head may be actuated over a storage medium. For example, the control circuitry 300 may send a control signal to the VCM to move the actuator arm and position the read/write head over the disk.

At block 612, a servo operating mode may be determined. For example, servo controller 342 may detect the current operating state of the data storage device to identify whether it is in a write mode (or other track follow mode), seek mode, or another servo mode.

At block 614, a selective switch may be made between servo address marks based on the servo operating mode. For example, servo controller 342 may choose to use either SAM 104 or SAMx 108 from the servo sector format 100, depending on whether the device is in full servo mode or track follow mode. In some configurations, both SAMs may be selected and processed for some operating modes based on the full servo gate.

At block 616, symbol timing may be determined from the selected servo address mark. For example, whichever SAM is selected, servo controller 342 may use its position and pattern to establish accurate symbol timing synchronization for processing subsequent servo information.

At block 618, a servo sector read signal may be processed using the determined symbol timing. For example, servo controller 342 may use the established symbol timing to accurately interpret the track identifier (if needed) and servo bursts.

At block 620, a position error signal may be determined. For example, servo controller 342 may calculate a position error signal based on the processed servo burst information, indicating how far the head is from the track center.

At block 622, the head may be positioned based on the determined position error signal. For example, servo controller 342 may provide the calculated position error signal to the servo control loop, which may then determine one or more control signals to adjust the position of the actuator arm (including any microactuators) to center the read/write head over the target track.

Figure 7:
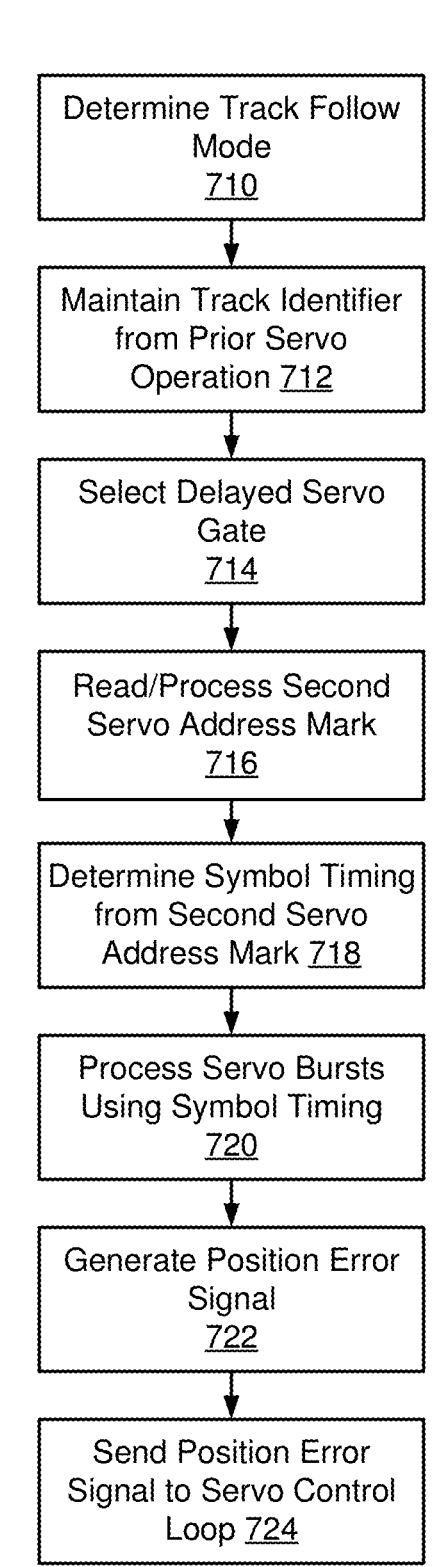
FIG. 7 is an example method of using a second servo address mark with a delayed servo gate during track follow modes.

FIG. 7 illustrates a flowchart of a method 700 for servo control in a data storage system. Method 700 may be executed by control circuitry 300 and servo controller 342 of a data storage device. Method 700 may result in improved format efficiency by enabling data to be written closer to the start of the servo sector, as well as improved servo processing efficiency during track follow operations. In general, method 700 may involve using a delayed servo gate and a second servo address mark to optimize servo control during track follow mode.

At block 710, a track follow mode may be determined. For example, servo controller 342 may determine that the data storage device is maintaining position over a target track for reading or writing operations.

At block 712, a track identifier from a prior servo operation may be maintained. For example, servo controller 342 may rely on the previously decoded track number from a prior servo sector or servo operation instead of reading it from the current servo sector.

At block 714, a delayed servo gate may be selected. For example, servo controller 342 may configure the servo gate logic to use a servo gate delay that postpones the start of servo processing until just before the second servo address mark.

At block 716, a second servo address mark may be read and processed. For example, servo controller 342 may locate and process the SAMx in the servo sector format without processing the preceding servo information.

At block 718, symbol timing may be determined from the second servo address mark. For example, servo controller 342 may process SAMx in a corresponding synchronization window to establish accurate symbol timing for processing the subsequent servo bursts.

At block 720, servo bursts may be processed using the determined symbol timing. For example, servo controller 342 may read and process the A burst and B burst in the servo sector format to determine fine positioning information.

At block 722, a position error signal may be generated based on the processed servo bursts. For example, servo controller 342 may calculate a position error signal indicating how far the head is from the track center based on the phase and/or amplitude values for the set of servo bursts.

At block 724, the generated position error signal may be sent to a servo control loop. For example, servo controller 342 may process the calculated position error signal through a servo control loop for head positioning adjustments and send corresponding control signals to one or more actuator motors.

FIG. 8 illustrates a flowchart of a method 800 for processing servo information in a data storage device. Method 800 may be executed by control circuitry 300 and servo controller 342 of a data storage device. Method 800 may support the selection of different servo address marks and operation of methods 600 and 700. In general, method 800 may involve using a full servo gate and processing all servo information during full servo mode in contrast with the using the delayed servo gate as described for method 700.

At block 810, a full servo mode may be determined. For example, servo controller 342 may that the data storage device is performing a seek operation or recovering from an error, necessitating full servo processing to establish gain, timing, and/or track identification.

At block 812, a full servo gate may be selected. For example, servo controller 342 may configure the servo gate logic to use a full servo gate that initiates servo processing at the beginning of the servo sector.

At block 814, gain may be adjusted for the servo sector based on the tone pattern of the preamble. For example, servo controller 342 may use a tone detector to process the preamble and adjust the gain and frequency timing settings for reading the subsequent servo information.

At block 816, a first servo address mark may be read and processed. For example, servo controller 342 may use the SAM detector in a synchronization window to locate and process the first SAM in the servo sector.

At block 818, symbol timing may be determined from the first servo address mark. For example, servo controller 342 may use the synchronization mark in the detected SAM to establish accurate symbol timing for processing the subsequent servo information.

At block 820, a track identifier may be read and processed using the determined symbol timing. For example, servo controller 342 may use the track ID logic to decode the Gray code and determine the current track number.

At block 822, servo bursts may be read and processed using the determined symbol timing. For example, servo controller 342 may read and process the set of servo bursts to determine fine positioning information.

At block 824, a position error signal may be generated based on the processed information. For example, a PES generator in servo controller 342 may calculate a position error signal based on the processed servo burst information and the decoded track identifier.

At block 826, the generated position error signal may be sent to the servo control loop. For example, servo controller 342 may process the calculated position error signal through a servo control loop for head positioning adjustments and send corresponding control signals to one or more actuator motors during seek or error recovery operations.

Figure 9:
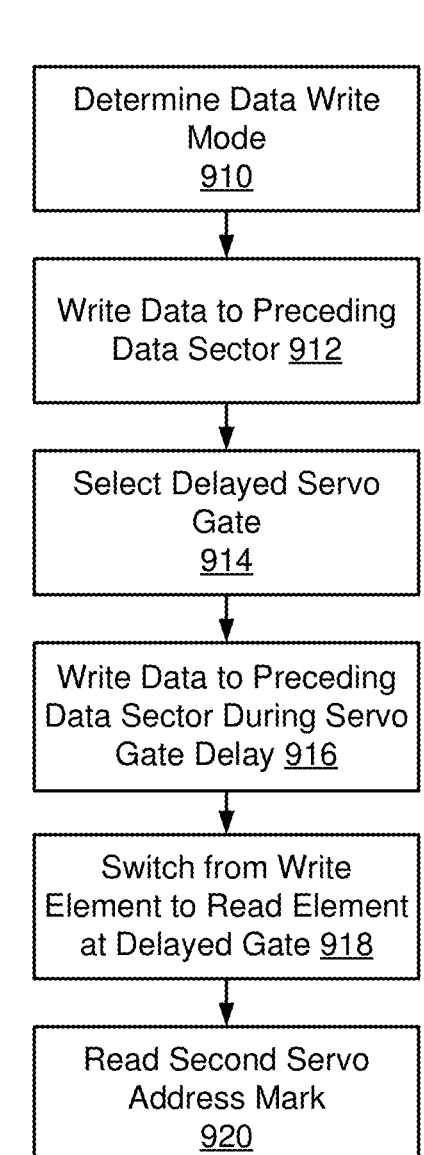
FIG. 9 is an example method of writing data to previously unused disk space during the delayed servo gate in data write mode.

FIG. 9 illustrates a flowchart of a method 900 for writing data in a data storage system. Method 900 may be executed by control circuitry 300 of the data storage device 50. The method 900 may result in improved data storage efficiency while maintaining accurate positioning through servo address mark reading. In general, method 900 may involve optimizing data writing by utilizing a delayed servo gate and switching between write and read elements.

At block 910, a data write mode may be determined. For example, control circuitry 300 may determine that the data storage device is preparing to write data to the data sectors on the disk.

At block 912, data may be written to a data sector preceding a next servo sector. For example, read/write channel 320 may send write signals to the write element to record data in the data sector immediately before the upcoming servo sector.

At block 914, a delayed servo gate may be selected. For example, servo controller 342 may configure the servo gate logic to use a servo gate delay that postpones the start of servo processing until just before the second servo address mark.

At block 916, data may be written to the preceding data sector during a servo gate delay period. For example, read/write channel 320 may continue sending write signals to the write element to record data in the previously unused disk space between the nominal end of the data sector (if the first SAM were being used) and the delayed servo gate for the second SAM.

At block 918, a switch from a write element to a read element may occur at the delayed gate time. For example, control circuitry 300 may signal the preamp to switch from the write element to the read element when the delayed servo gate opens.

At block 920, a second servo address mark may be read. For example, servo controller 342 may use the SAM detector to locate and process SAMx in the servo sector format, establishing symbol timing for subsequent servo burst processing and PES generation.

Technology for servo formats based on servo sectors with multiple servo address marks that may be selectively used for symbol timing in different operating modes is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device, comprising:
a storage medium comprising a plurality of angularly spaced servo sectors defining a plurality of servo tracks and corresponding data sectors between consecutive servo sectors, wherein each servo sector is comprised of servo patterns corresponding to different servo tracks and comprising:
a track identifier;
a set of position error bursts;
a first servo address mark preceding the track identifier; and
a second servo address mark following the track identifier;
a head actuated over the storage medium for reading the plurality of angularly spaced servo sectors; and
control circuitry configured to:
selectively switch, based on a servo operating mode, between the first servo address mark and the second servo address mark for determining symbol timing for processing the servo pattern; and
select, responsive to the servo operating mode, between a full servo gate for using the first servo address mark and a delayed servo gate for using the second servo address mark.

2. The data storage device of claim 1, wherein the control circuitry is further configured to determine a servo operating mode selected from:
a track follow mode;
a data write mode;
a data read mode;

a seek mode;

a head switch mode;

a head load mode; and an error recovery mode.

3. The data storage device of claim 2, wherein the control circuitry is further configured to:

responsive to determining the track follow mode, use the second servo address mark to determine symbol timing for processing the set of position error bursts; and responsive to determining another servo operating mode, use the first servo address mark to determine symbol timing for processing the track identifier and the set of position error bursts.

4. The data storage device of claim 3, wherein the control circuitry is further configured to process the track identifier using the second servo address mark by post-processing the track identifier based on the symbol timing determined from the second servo address mark.

5. The data storage device of claim 3, wherein:

the servo patterns further comprise a preamble comprising a tone pattern for adjusting gain for reading the corresponding servo sector;

the first servo address mark is positioned between the preamble and the track identifier; and processing the track identifier using the first servo address mark comprises determining symbol timing from the first servo address mark prior to reading the track identifier.

6. The data storage device of claim 5, wherein:

the head comprises a read element and a write element;

a relative position of the read element to the write element in a down track direction determines a read-write separation; and a combined length of the preamble, the first servo address mark, and the track identifier is less than the read-write separation.

7. The data storage device of claim 1, wherein:

the servo operating mode comprises a data write mode;

the head comprises a read element and a write element;

a relative position of the read element to the write element in a down track direction determines a read-write separation; and the control circuitry is further configured to, during the data write mode:

write data to a target data sector preceding a corresponding servo sector;

switch, based on the read-write separation, from the write element of the head to the read element of the head while the read element is positioned over the track identifier; and read, responsive to switching to the read element, the second servo address mark.

8. The data storage device of claim 1, wherein the first servo address mark comprises a different field value than the second servo address mark.

9. The data storage device of claim 1, wherein the control circuitry is further configured to, responsive to the servo operating mode being a seek mode, use the first servo address mark to determine symbol timing for processing the track identifier and the set of position error bursts.

10. The data storage device of claim 1, wherein:

the track identifier is encoded as a Gray code value;

the set of position error bursts comprises at least two burst patterns offset from a servo track center; and the second servo address mark is located in a distinct set of symbols between the track identifier and the set of position error bursts.

11. A method comprising:

actuating a head over a storage medium for reading a plurality of servo tracks, wherein:

the storage medium comprises a plurality of angularly spaced servo sectors defining the plurality of servo tracks and corresponding data sectors between consecutive servo sectors; and each servo sector is comprised of servo patterns corresponding to different servo tracks and comprising:

a track identifier;

a set of position error bursts;

a first servo address mark preceding the track identifier; and a second servo address mark following the track identifier;

selectively switching, based on a servo operating mode, between the first servo address mark and the second servo address mark for determining symbol timing for processing the servo pattern;

positioning the head based on a read signal from the servo pattern and the determined symbol timing;

writing, responsive to the servo operating mode being a data write mode, data to a target data sector preceding a corresponding servo sector;

switching from a write element of the head to a read element of the head while the read element is positioned over the track identifier, wherein a relative position of the read element to the write element in a down track direction determines a read-write separation for switching; and reading, responsive to switching to the read element, the second servo address mark.

12. The method of claim 11, further comprising:

determining the servo operating mode selected from:

a track follow mode;

a data write mode;

a data read mode;

a seek mode;

a head switch mode;

a head load mode; and an error recovery mode.

13. The method of claim 12, further comprising:

responsive to determining the track follow mode, using the second servo address mark to determine symbol timing for processing the set of position error bursts; and responsive to determining another servo operating mode, using the first servo address mark to determine symbol timing for processing the track identifier and the set of position error bursts.

14. The method of claim 13, further comprising:

processing, responsive to determining the track follow mode, the track identifier using the second servo address mark by post-processing the track identifier based on the symbol timing determined from the second servo address mark.

15. The method of claim 13, wherein:

the servo patterns further comprise a preamble comprising a tone pattern for adjusting gain for reading the corresponding servo sector;

the first servo address mark is positioned between the preamble and the track identifier; and processing the track identifier using the first servo address mark comprises determining symbol timing from the first servo address mark prior to reading the track identifier.

16. The method of claim 15, wherein:

the head comprises a read element and a write element;

a relative position of the read element to the write element in a down track direction determines a read-write separation; and a combined length of the preamble, the first servo address mark, and the track identifier is less than the read-write separation.

17. The method of claim 11, wherein the second servo address mark is located in a distinct set of symbols between the track identifier and the set of position error bursts.

18. The method of claim 11, wherein the first servo address mark comprises a different field value than the second servo address mark.

19. The method of claim 11, further comprising, responsive to the servo operating mode:

selecting between a full servo gate for using the first servo address mark and a delayed servo gate for using the second servo address mark.

20. A data storage device comprising:

a storage medium comprising a plurality of angularly spaced servo sectors defining a plurality of servo tracks and corresponding data sectors between consecutive servo sectors, wherein each servo sector is comprised of servo patterns corresponding to different servo tracks and comprising:

a track identifier;

a set of position error bursts;

a first servo address mark preceding the track identifier; and a second servo address mark following the track identifier;

a head actuated over the storage medium for reading the plurality of angularly spaced servo sectors;

means for selectively switching, based on a servo operating mode, between the first servo address mark and the second servo address mark for determining symbol timing for processing the servo pattern;

means for using, responsive to determining that the servo operating mode is a track follow mode, the second servo address mark to determine symbol timing for processing the set of position error bursts; and means for using, responsive to determining that the servo operating mode is another servo operating mode, the first servo address mark to determine symbol timing for processing the track identifier and the set of position error bursts.

* * * * *